United States Patent Office 3,440,013
Patented Apr. 22, 1969

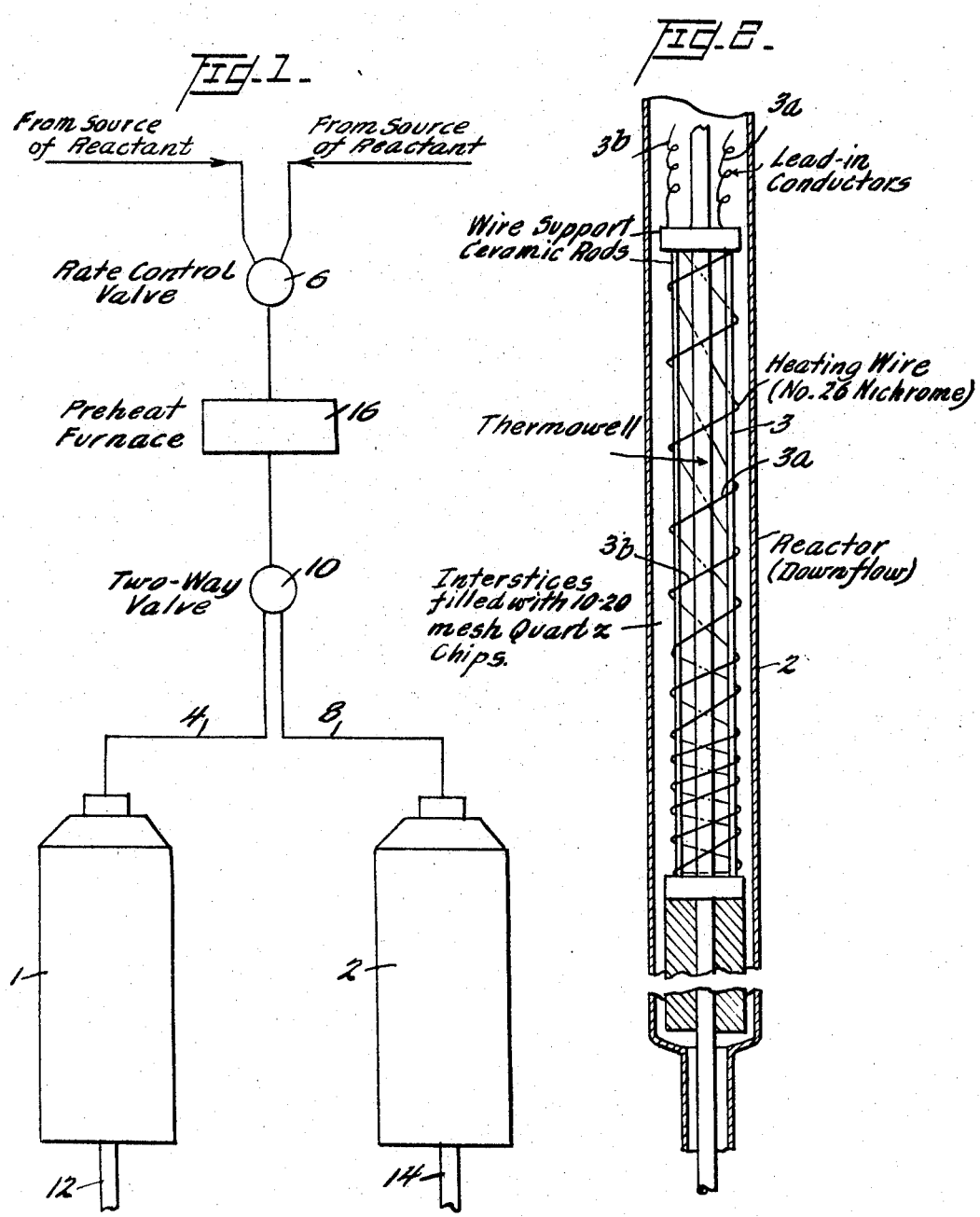

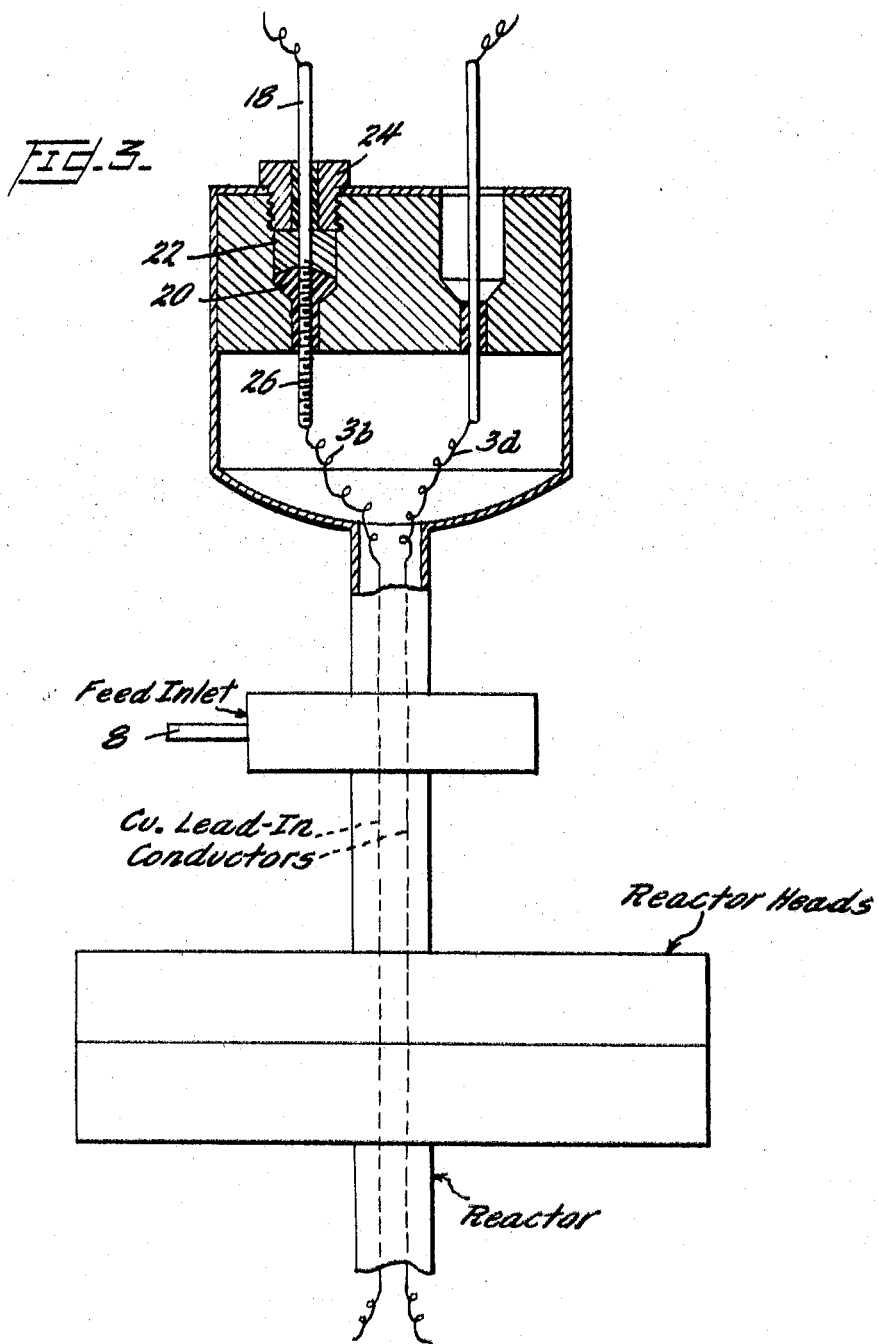

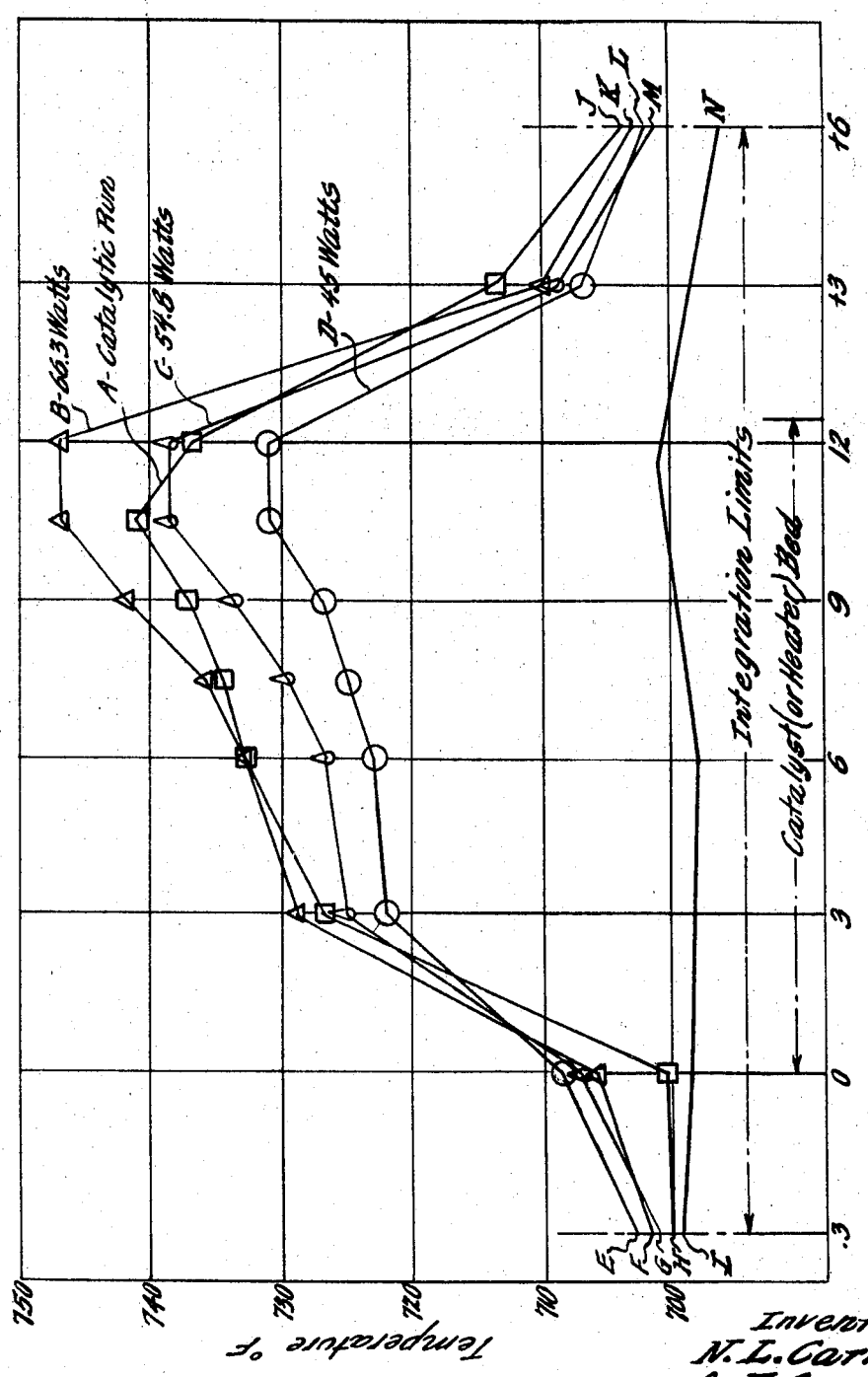

3,440,013
APPARATUS AND PROCESS FOR DIRECT MEASUREMENT OF HEAT OF REACTION
Norman L. Carr, Allison Park, and Allen E. Somers, Pittsburgh, Pa., assignors to Gulf Research & Development Company, Pittsburgh, Pa., a corporation of Delaware
Filed Dec. 1, 1964, Ser. No. 415,016
Int. Cl. G01k 17/08
U.S. Cl. 23—230                                  3 Claims

ABSTRACT OF THE DISCLOSURE

An apparatus and process for obtaining exothermic reaction energies at elevated temperatures in a reactant stream passing through a catalyst bed. The chemical energy released in the chemical reaction is matched with the electrical energy released as heat in an equivalent physical system. The apparatus includes an electrical heating element surrounded by inert particles and designed to fit in a reactor in place of a catalyst bed. Examples of the type of reactions to which the apparatus and process can be applied are hydrogenation, hydrocracking and desulfurization.

---

This invention relates to an improved procedure for accurate measurements of the heat of reaction of fluid reactants and an improved apparatus for carrying out the measurements.

In designing pilot plant or refining scale chemical reactors, the heat of reaction ($-\Delta Hr$) for the process being considered is of indispensable value. For large-scale adiabatic operations, knowledge of ($-\Delta Hr$) aids in sizing reactors, calculation of quench stream rates, calculation of performance to be expected at various operating conditions, design of the reactor control system, and in over-all system heat balance.

For complex reacting systems such as those encountered in petroleum processing, it is difficult, if not impossible, to calculate precise ($-\Delta Hr$) values from tabulated values of pure compound thermodynamic data such as heats of formation or heats of combustion. Estimates of ($-\Delta Hr$) can often be obtained indirectly from pilot-plant and refinery test run data. However, for good design and scale-up work, a direct measurement of ($-\Delta Hr$) in situ at reaction temperature and pressure is desirable.

It has been known to measure heating values and heats of reaction by various calorimetric methods. U.S. 2,197,370, for instance, measures the heating value of a gas by burning the gas in contact with a catalytic material and measuring the temperature rise resulting from the combustion. U.S. 2,689,477 describes a method for measuring heating values of fuels in which a gaseous, heat-absorbing fluid is successively heated in two separate steps. The temperature rise brought about by an unknown combustible and by an adjustable heating device which has a known rate of thermal output, is compared by balancing a Wheatstone bridge to determine the heating value of the unknown compound. U.S. 2,733,602 and 2,911,824 are further examples of refinements of electrical energy comparing apparatus for accurately determining caloric value. However, none of the calorimeters described in the literature and prior art are satisfactory for determining ($-\Delta Hr$) for the purposes previously described.

It is an object of this invention to provide an improved apparatus for measuring heats of reaction. Another object is to provide a simple process for determining the heat of reaction of fluid reactants. A further object is to improve the state of the art.

These and other objects of this invention are accomplished by an apparatus comprising two elongated cylinders serving as reactors. One of the reactors is adapted to contain a catalyst bed while the other contains an electrical heating coil which is wound around the cylindrical reactor. Means are provided for introducing fluid reactants into one end of each cylinder at a controlled rate, for preheating the reactants, and for measuring the temperature profile of each cylinder. This apparatus includes means for measuring the amount of conversion of the reactants in the reactor which is adapted to contain the catalyst.

This invention also includes a procedure for determining the exothermic heat of reaction by passing reactants through a reactor under controlled conditions, recording the temperature profile in the reactor and passing the same reactants through a second reactor having substantially the same characteristics. This second passage is at the same controlled conditions as the first-mentioned passage. The temperature profile that is obtained in the first reactor is approximately matched with the heating apparatus in the second reactor by applying various wattages to the heater. The area under this curve (between block and reactor temperature) is measured and this value is compared with the area determined in the catalytic reactor.

In the following description I have given examples of this invention, but it is to be understood that these are set forth for the purpose of illustration and not in limitation thereof.

Referring to the accompanying drawings:
FIGURE 1 illustrates diagrammatically a convenient modification of my invention utilizing two reactors;
FIGURE 2 is a vertical enlarged section showing the construction of one of the reactors of FIGURE 1;
FIGURE 3 gives a detailed description of the reactor ahead of the reactor shown in FIGURE 2;
FIGURE 4 shows in graph form the results of one measurement of heat of reaction in accordance with this invention.

Referring specifically to FIGURE 1, two bench-scale catalytic reactors are shown parallel to each other and each being connected separately to the same source of fluid reactants. These may be standard 1″ I.D. bench-scale reactors. One reactor 2 has an electric heater tailored to fit inside it and the other reactor, reactor 1, has a bed of catalyst placed within and extending the same distance as the heating coil. The length of both the catalyst bed and heating coil should be substantially less than the total reactor length in order to reduce heat losses occurring at the ends of the heating block.

FIGURE 2 gives a more detailed description of reactor 2 containing the electric heater 3. The heating coil may be wound in such a manner that the heat generated in various areas corresponds to that generated in the other reactor. For instance, the coil may be exponentially wound at either end or it may be wound linearly depending on the type of reaction to be studied. For example, a study of furnace oil hydrocracking, in which reaction rates are constant, would advantageously utilize a linear wound heater. A desulfurization reaction, on the other hand, would advantageously utilize an exponential heater with most of the winding at the front or top end of the reactor. The interstices of the column are filled with 10–20 mesh quartz chips to provide a heat transfer medium similar to that in the catalyst bed. The lead-in conductors for the heating coil are designated by 3a and 3b. The particular electric heating assembly shown is approximately ⅝″ in diameter and 12″ in length. However, the apparatus can vary greatly in size and the dimensions given are in no way limiting.

FIGURE 3 gives a detailed description of the reactor head. This head is a special high pressure closure which enables the transfer of lead-in conductors from the outside to the inside of the reactor. Copper leads are fastened to 10-gage bronze rods 18 which are passed through a steel disk into the high pressure side of the reactor enclosure. The bronze rods are held in place by threaded Teflon cones 20, steel followers 22, and packing nuts 24. The annular spaces between the rods, followers and nuts are insulated with Teflon film. At the bottom of the bronze rods, bead-insulated copper wire 26 is connected to the heating element.

Referring again to FIGURE 1, numeral 4 designates a conduit for introducing the reactants at a rate controlled by valve 6 into reactor 1. Numeral 8 designates a conduit for introducing reactants into reactor 2 at a rate controlled by valve 6. Valve 10 is a two-way valve so that reactants may be introduced into reactor 1 via conduit 4 and reactor 2 via conduit 8. This enables a reaction to be run in reactor 2 at a later time if desired. Conduit 12 is provided at the base of reactor 1 for removal of reaction products and unreacted components, and conduit 14 is provided at the base of reactor 2 for removal of introduced reactants. Numeral 16 designates a furnace where, if necessary, the reactants may be preheated to any desired temperature.

To use the apparatus a catalytic run is first made in reactor 1 at a temperature and pressure desired for the process to be studied (hydrocracking or hydrogenation, etc.). This is accomplished by switching valve 10 to cause the reactants to flow into reactor 1 where they are caused to react with each other in the presence of a catalyst for the reaction. In the event that heat is necessary to initiate the reaction, the reactants may be preheated in furnace 16 to about reaction temperature or the catalyst may be heated. An accurate catalyst bed temperature profile is obtained during this run and a precise measurement of the conversion is obtained. A second run is made in reactor 2 under identical flow conditions, and at the same temperature and pressure.

It is not necessary that the temperature profiles of the two reactors are matched exactly. However, it is imperative that the enclosed areas between the reaction temperature profiles and block temperature profiles be closely matched, since it is these areas which are functions of the heat generated. This matching process will be explained in detail in Example I. Conversion of wattage to heat generated gives a value for the heat of reaction which may be in terms of kilo calories per mole of conversion or the like.

Example I

The apparatus illustrated in FIGURE 1 was used to measure ($-\Delta Hr$) for the hydrocracking of pretreated furnace oil. The oil was hydrocracked at 700° F. (base temperature), 1000 p.s.i.g., 2 LHSV, and at a 9.0 mole ratio of hydrogen to oil. A catalyst composed of 6% Ni, 19% W, 2% F on "Aerocat Triple A" high alumina, silica-alumina was used to promote the reaction.

Referring to FIGURE 4, curve A represents the various temperatures recorded during the catalytic run as the reaction proceeded from points H to J. Integration or computation of the area under curve A is computed using the limits of points H and J and base line (block profile) IN. Similar curves (temperature profiles) are obtained for the electric heater runs and are represented by curves B, C and D. The base line (block profile) for the electric heater runs (reactor 2) is also represented by line IN. The limits of integration for the area under curves B, C and D are points F, G, E and K, M, L, and line IN. It should be noted that the temperature rise is not confined to the catalyst bed section. FIGURE 4 shows axial conduction both upstream and downstream. Because of this fact, areas are determined three inches above the bed and six inches below the bed to include all the heat generated. This procedure allows different feed rates to be used, with different degrees of axial conduction, and still include all the heat generated in the area determinations.

The values obtained by integration of the area under curves B, C and D may be in any area units desired. Known methods of integration familiar to those skilled in the art may be used, such as counting the squares on a graph within the defined limits with the aid of a planimeter. As may be seen from FIGURE 4, curves B, C and D do not represent the exact area determined in the catalytic run. To obtain the exact wattage value for the catalytic run a plot of area (between block and reactor temperature) versus applied wattage is made. The area computed for the catalytic run is then placed on the curve obtained from this plot and the corresponding wattage is directly obtained. Measurement in the specific example given showed the heat generated by use of the electric heater in reactor 2, to duplicate the area of the catalytic run (reactor 1), was 54.8 watts resulting in a heat of reaction of 21.2 kilocalories/mole of hydrogen consumed.

Example II

The apparatus and procedures of Example I were used to determine the ($-\Delta Hr$) of the benzene hydrogenation system. Benzene was hydrogenated with an aged Ni 010 catalyst (composed of 55% reduced Ni on kieselguhr) at 500° F. (block), 10 p.s.i.g. and a hydrogen ratio of 2.7 mole per mole. The heat measured at 20% wt. conversion was 77.4 watts which coincided exactly with API heat of formation data (77.4 watts or 66.6 kilocalories).

We claim:

1. In a process for determining the exothermic heat of reaction in a fluid reactant stream catalyzed by passage through a solid particulate catalyst bed the steps which comprise passing a fluid reactant stream at conditions of reaction through a first reactor containing a solid particulate catalyst bed, obtaining a first internal temperature profile of said first reactor during reaction of said reactant stream, passing an equivalent fluid reactant stream at substantially the same flow rate but without significant reaction through a second reactor having substantially the same physical characteristics as said first reactor but without catalyst, internally electrically heating said second reactor to produce a second internal temperature profile defining an area substantially equal to the area defined by said first temperature profile, and measuring the electrical energy required to produce said second temperature profile.

2. A process in accordance with claim 1 in which the shape of said second temperature profile is approximately the same as the shape of said first temperature profile.

3. A process in accordance with claim 1 in which the second reactor contains a bed of solid inert particulate material and in which the electrical energy is converted into the heat of reaction.

References Cited

UNITED STATES PATENTS 1,594,593  8/1926  Boertlein _____ 23—253
3,059,471  10/1962  Calvet _____ 73—190

MORRIS O. WOLK, Primary Examiner.

ELLIOTT A. KATZ, Assistant Examiner.

U.S. Cl. X.R.

23—253; 73—190